(12) United States Patent
Noda et al.

(10) Patent No.: US 6,502,788 B2
(45) Date of Patent: Jan. 7, 2003

(54) PANEL OF COMPOSITE MATERIAL AND METHOD OF FABRICATING THE SAME

(75) Inventors: Masahiro Noda, Tokyo-To (JP); Yasuhiro Toi, Tokyo-To (JP); Takayuki Nagao, Tokyo-To (JP); Kazuaki Amaoka, Tokyo-To (JP); Atsushi Harada, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,842

(22) Filed: Mar. 9, 2001

(65) Prior Publication Data

US 2001/0051251 A1 Dec. 13, 2001

(30) Foreign Application Priority Data

Mar. 10, 2000 (JP) ........................................ 2000-066750

(51) Int. Cl.$^7$ .................................................... B32B 3/18
(52) U.S. Cl. ........................ 244/123; 244/119; 244/131; 428/119
(58) Field of Search ................................. 244/119, 123, 244/131; 428/119, 188; 52/739.1, 733.3, 733.2

Primary Examiner—Alexander S. Thomas
(74) Attorney, Agent, or Firm—Smith, Gambrell & Russell, LLP

(57) ABSTRACT

A panel of composite material including two outside skin parts, a plurality of stringers, connecting members for connecting the plurality of stringers, and a reinforcing member connecting the two outside skin parts with each other. Each of the two outside skin parts is formed into one body. A portion protruding upward from the plurality of stringers is provided on the connecting members, and is connected to the reinforcing member by a fastener.

3 Claims, 5 Drawing Sheets ically made of fiber-reinforced resin, dimensional accuracy thereof may be improved. In addition, assembling time may be shortened because it is unnecessary to adjust a gap between the connecting member and the reinforcing member. Jig-setting time may be also shortened because any complicated mandrel is unnecessary for integratedly forming the stringers, the connecting member and the outside skin.

PANEL OF COMPOSITE MATERIAL AND METHOD OF FABRICATING THE SAME

BACKGROUND OF THE INVENTION

1. Field of the Invention

The invention relates to a panel of composite material for constructing an aircraft airframe or an aircraft wing and to a method of fabricating the same.

2. Description of the Related Art

An aircraft wing of composite material is constructed by forming a lower outside skin, an upper outside skin, spars and ribs separately, and then by fastening the lower outside skin, the upper outside skin, the spars and the ribs by using fastening means. Alternatively, an aircraft panel of composite material is constructed by forming a combined structure of composite material integratedly including a lower outside skin (or an upper outside skin), spars and ribs and then by fastening an upper outside skin (or a lower outside skin) to the combined structure by using fastening means.

The aircraft wing of composite material formed by fastening together the component members is a structure comprising a large number of component parts. Since work for assembling the aircraft wing needs special assembling jigs and complicated operations, the aircraft wing is costly.

The aircraft wing constructed by using the combined structure having either the lower outside skin or the upper outside skin is based on the conventional concept of structure. Thus, jigs and processes are complicated and hence the aircraft wing is costly.

SUMMARY OF THE INVENTION

The present invention has been made in view of the foregoing circumstances. Therefore, the object of this invention is to provide a panel of composite material having a greatly reduced number of component parts, and capable of being assembled by greatly reduced manhours and of being fabricated at a low cost, and a method of fabricating such a panel.

To achieve the above object, this invention is characterized by following features. That is, this invention is a method of fabricating a panel of composite material including two outside skins and stringers attached inside of the two outside skins for reinforcing the two outside skins, said method comprising the steps of: forming a plurality of stringers for reinforcing outside skins from dry preformed fibers; disposing the plurality of stringers at a predetermined interval and connecting adjacent two stringers with each other via a connecting member made from dry preformed fibers; setting the connected stringers and the connecting members into a forming mold and introducing resin into the forming mold to impregnate the dry preformed fibers of the stringers and the connecting members; curing the resin-impregnated stringers and the resin-impregnated connecting members to unite the resin-impregnated stringers and the resin-impregnated connecting members into one body of "Rudder Shape" stringer; laminating a prepreg onto an outside-skin shaping mold; disposing the united stringers and connecting members onto the laminated prepreg; curing the laminated prepreg and the united stringers and connecting members to form an outside-skin part in which the stringers, the connecting members and an outside skin are united; and connecting two outside-skin parts with each other via a reinforcing member to form a panel of composite material.

According to the feature, since the stringers and the connecting member are integratedly made of fiber-reinforced resin, dimensional accuracy thereof may be improved. In addition, assembling time may be shortened because it is unnecessary to adjust a gap between the connecting member and the reinforcing member. Jig-setting time may be also shortened because any complicated mandrel is unnecessary for integratedly forming the stringers, the connecting member and the outside skin.

In the panel of composite material according to the invention, the outside-skin part, in which the stringers, the connecting member and the outside skin are united, is formed integratedly. The connecting member may have an extended portion protruding upward with respect to the stringers. The extended portion may be connectable by a fastener. Two outside-skin parts may be connected by connecting the respective extended portions via the reinforcing member with fasteners.

Alternatively, this invention is a method of fabricating a wing of composite material, said method comprising the steps of: forming a plurality of stringers for reinforcing outside skins of a wing from dry preformed fibers; disposing the plurality of stringers at a predetermined interval and connecting adjacent two stringers with each other via a connecting member made from dry preformed fibers; setting the connected stringers and the connecting members into a forming mold and introducing resin into the forming mold to impregnate the dry preformed fibers of the stringers and the connecting members; curing the resin-impregnated stringers and the resin-impregnated connecting members to unite the resin-impregnated stringers and the resin-impregnated connecting members into one body of "Rudder Shape" stringer; laminating a prepreg onto a first outside-skin shaping mold that has a shape of an upper surface of the wing; laminating a prepreg onto a second outside-skin shaping mold that has a shape of a lower surface of the wing; disposing united stringers and connecting members and semicured front and rear spars onto the prepreg laminated onto the first outside-skin shaping mold; disposing united stringers and connecting members onto the prepreg laminated onto the second outside-skin shaping mold; curing the laminated prepreg, the united stringers and connecting members, and the front and rear spars, to form a first wing-outside-skin part in which the stringer, the connecting members, the front and rear spars and an outside skin are united; and curing the laminated prepreg and the united stringers and connecting members to form a second wing-outside-skin part in which the stringer, the connecting members and an outside skin are united; connecting the front and rear spars of the first wing-outside-skin part to the second wing-outside-skin part via a fastener; and connecting the respective connecting members of the two wing-outside-skin parts with each other via a reinforcing member to form a predetermined shape of the wing.

BEST MODE FOR CARRYING OUT THE INVENTION

Embodiments of the invention are explained in more detail with reference to the drawings.

Figure 1:
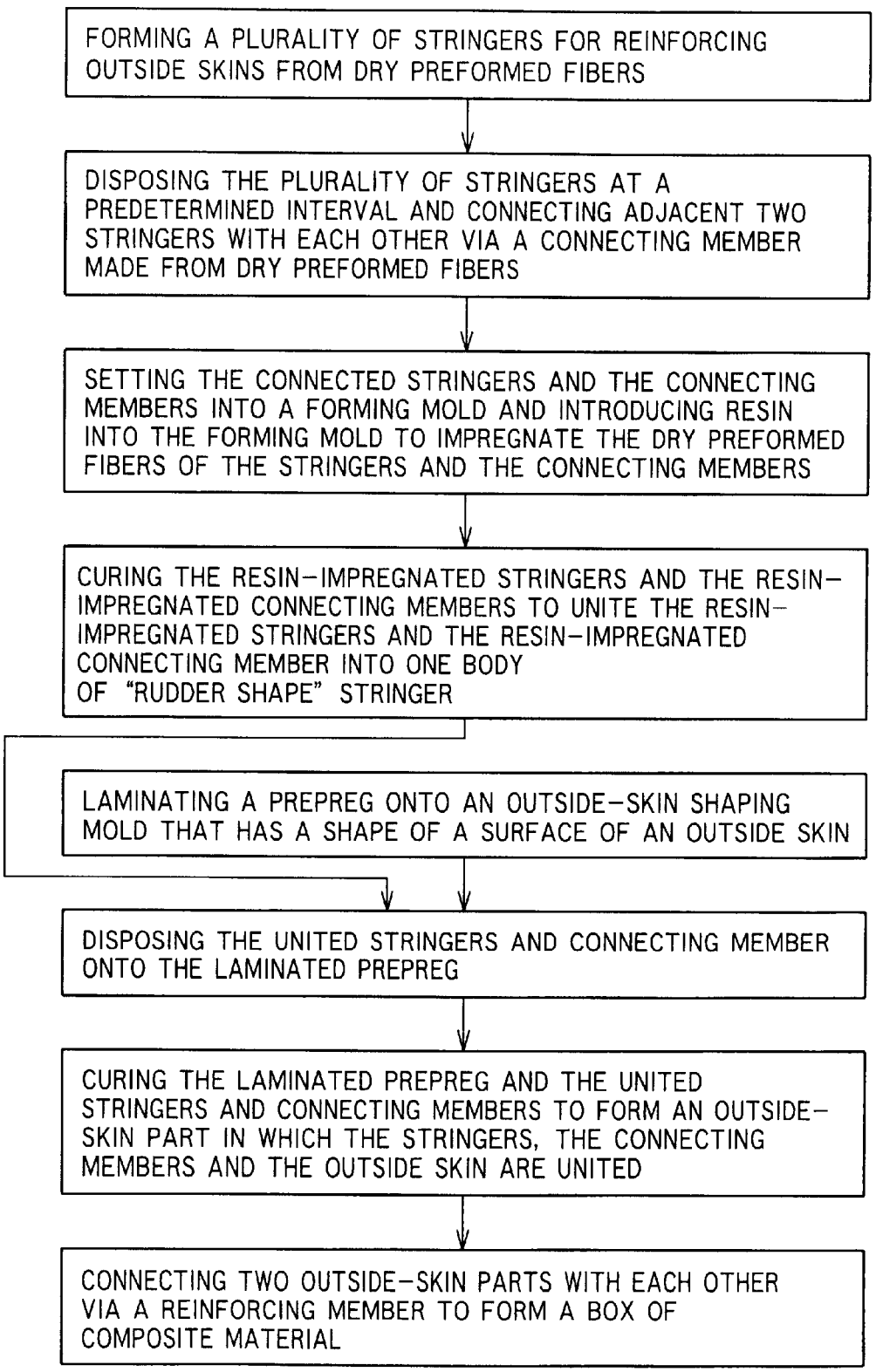
FIG. 1 is a flowchart of an embodiment of a method of fabricating a panel of composite material according to the invention.

FIG. 1 is a flowchart of an embodiment of a method of fabricating a panel of composite material according to the invention. As shown in FIG. 1, the method consists of steps of: forming a plurality of stringers for reinforcing outside skins from dry preformed fibers (STEP1); disposing the plurality of stringers at a predetermined interval and connecting adjacent two stringers with each other via a connecting member made from dry preformed fibers (STEP2); setting the connected stringers and the connecting members into a forming mold and introducing resin into the forming mold to impregnate the dry preformed fibers of the stringers and the connecting members (STEP3); curing the resin-impregnated stringers and the resin-impregnated connecting members to unite the resin-impregnated stringers and the resin-impregnated connecting members into one body of "Rudder Shape" stringer (STEP4) (forming the united stringers and connecting members made of fiber-reinforced resin); laminating a prepreg onto an outside-skin shaping mold that has a shape of a surface of an outside skin (STEP5); disposing the united stringers and connecting members onto the laminated prepreg (STEP6), curing the laminated prepreg and the united stringers and connecting members to form an outside-skin part in which the stringers, the connecting members and the outside skin are united (STEP7), and connecting two outside-skin parts with each other via a reinforcing member to form a box (panel) of composite material (STEP8).

Figure 2:
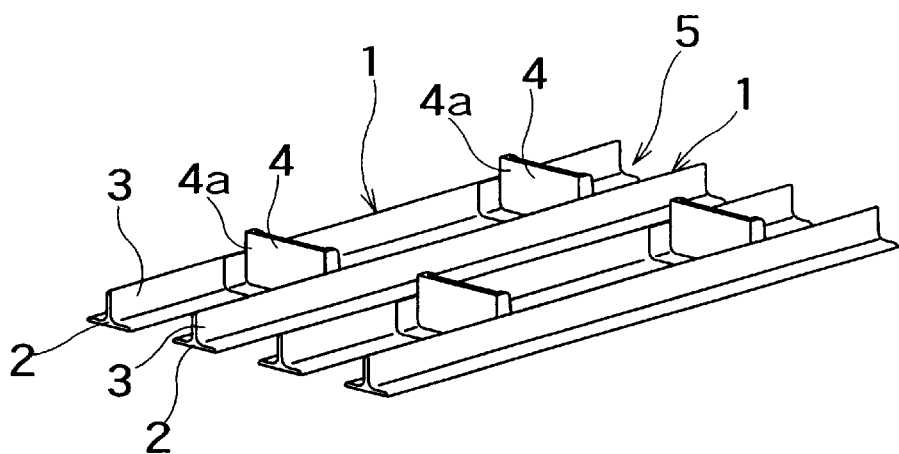
FIG. 2 is a perspective view of ladder-like reinforcing members.
Figure 7:
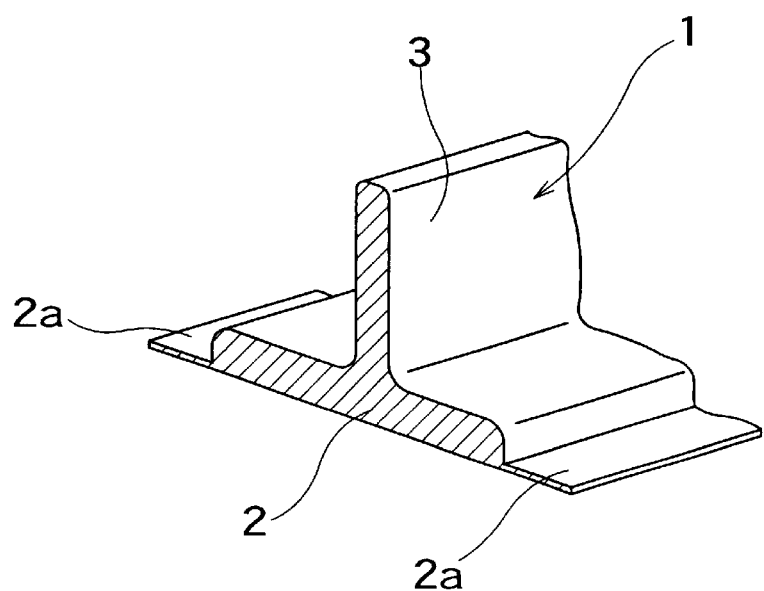
FIG. 7 is a perspective view of a modified stringer.

In the step of forming a plurality of stringers for reinforcing outside skins from dry preformed fibers (STEP1), each of the plurality of stringers 1 is made of a dry-preform that has been three-dimensionally shaped from two-dimensional woven fabrics. Alternatively, each of the plurality of stringers 1 is made of another dry-preform that has been three-dimensionally woven. As shown in FIG. 2, the stringer 1 has a plane portion 2 and a perpendicular portion 3 perpendicularly extended from a centerline of the plane portion 2. That is, the stringer 1 has a reversed T-shaped section. As shown in FIG. 7, under consideration of easiness for adhesion, the plane portion 2 may be provided with thin extended portions 2a at opposite side edges thereof. The stringers 1 are disposed in a longitudinal direction of the outside skins to reinforce the outside skins in an aircraft fuselage (structure).

In the step of disposing the plurality of stringers at a predetermined interval and connecting adjacent two stringers with each other via a connecting member made from dry preformed fibers (STEP2), as shown in FIG. 2, paired two stringers 1, 1 are selected from the plurality of stringers. The paired two stringers 1, 1 are disposed in parallel to each other at a predetermined interval. Then, the paired adjacent two stringers 1, 1 are connected via a connecting member 4 (SIATAI). The connecting member has a flange portion, hence has a reversed T-shaped section. In the case, a plurality of connecting members 4 are disposed between the two stringers 1, 1 at an interval in a longitudinal direction of the stringers 1, 1.

If the number of disposed stringers 1 is more than two, it is preferable that connecting members 4 for connecting adjacent three stringers 1 are not arranged on the same lateral line but in a cross-stitch manner. Each connecting member 4 is made of a dry-preform that has been three-dimensionally shaped from two-dimensional woven fabrics. Alternatively, each connecting member 4 is made of another dry-preform that has been three-dimensionally woven. The connecting member 4 has an extended portion 4a, which is protruded upward from the stringers 1, 1 when the connecting member 4 is disposed between the stringers 1, 1.

In the step of setting the stringers and the connecting member into a forming mold and introducing resin into the forming mold to impregnate the dry preformed fibers of the stringers and the connecting members (STEP3), the parallel disposed two stringers 1, 1 and the plurality of connecting members 4 are fixed in the forming mold, which is closed tightly except an air-outlet port and a resin-inlet port. Then, the resin is introduced into the forming mold through the resin-inlet port, so that the dry preformed fibers of the stringers 1 and the connecting members 4 are impregnated with the resin. After that, the resin-impregnated stringers 1 and the resin-impregnated connecting members 4 are cured (heated and hardened) to form a ladder-like reinforcing structure 5 (STEP4). In the case, the resin is cured (hardened) not completely but only to a half level. The half level of the curing (semicuring level) means a state capable of removed from the forming mold and of maintaining its own shape even if the semicured resin is more heated as far as a predetermined load is not given. In the ladder-like reinforcing structure 5, as shown in FIG. 2, the extended portions 4a of the connecting members 4 protrude upward from the stringers 1.

The shape of the ladder-like reinforcing structure 5 can be modified in the semicured state. In addition, the connecting members 4 in the semicured state may be provided with a or more through openings for a or more fuel pipes and/or a or more air pipes. A non-destructive test can be conducted to the ladder-like reinforcing structure 5 as a component before assembled into the panel of composite material. The forming mold may be a simple mold having grooves according to the ladderlike pattern.

Figure 3:
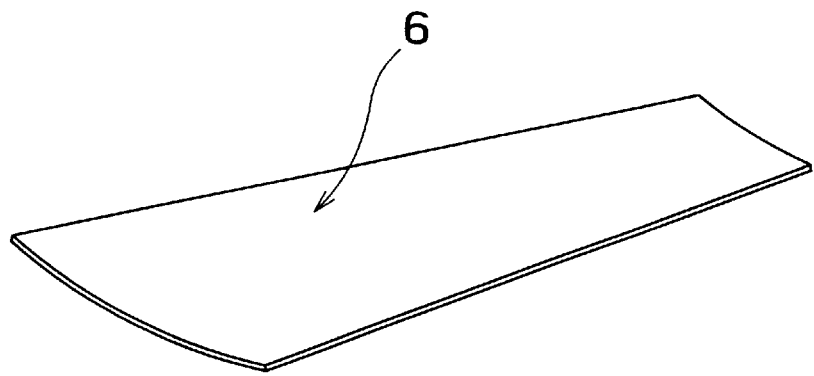
FIG. 3 is a perspective view of a prepreg for an outside skin.

In the step of laminating a prepreg onto an outside-skin shaping mold that has a shape of a surface of an outside skin (STEP5), a prepreg is laminated onto a shaping mold (not shown) having a shaping surface corresponding to a surface of the panel. At that time, the prepreg is laminated in such a manner that a or more operational holes suitable for assembling or inspecting the panel may be formed in the prepreg. The laminated prepreg forms a prepreg outside skin 6 shown in FIG. 3.

In the step of disposing the united stringers and connecting members onto the laminated prepreg (STEP6), a plurality of semicured ladder-like reinforcing structures 5 are disposed onto the prepreg outside skin 6 via an adhesive film 7 (see FIG. 5) in parallel to each other. In the case, the stringers 1 of the ladder-like reinforcing structures 5 are arranged in the longitudinal direction of the prepreg outside skin 6. If an interval of adjacent two ladder-like reinforcing structures 5 is enlarged, space for the operational holes is easily ensured.

Figure 4:
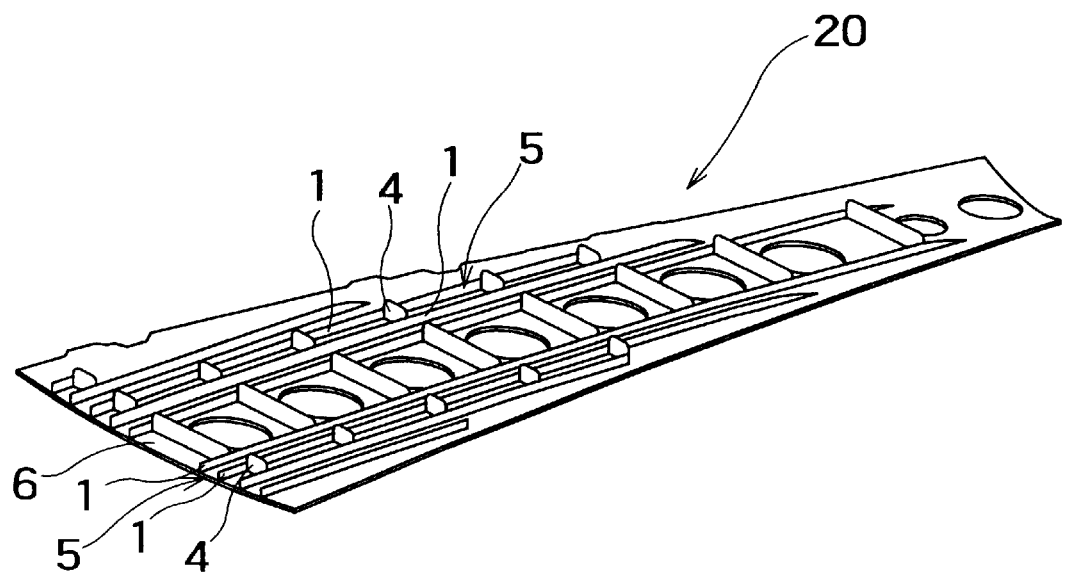
FIG. 4 is a perspective view of an outside-skin part.
Figure 5:
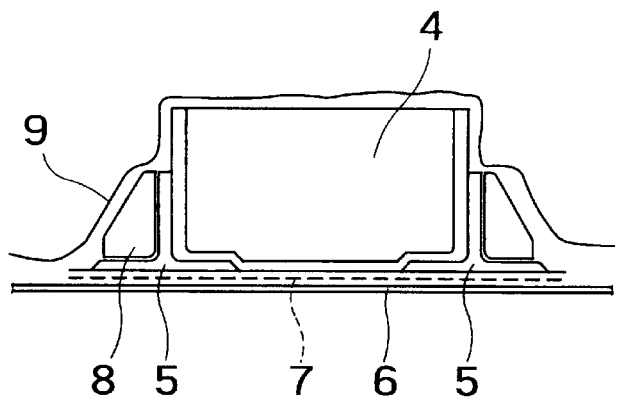
FIG. 5 is a view for explaining a method of forming the outside-skin part.
Figure 6:
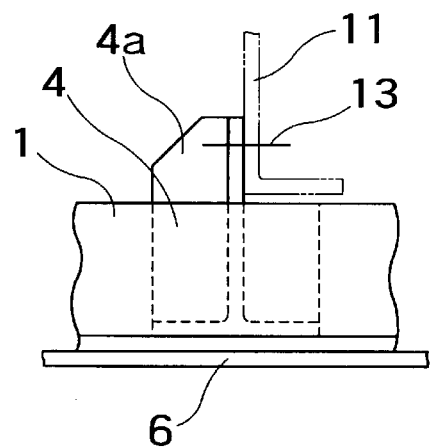
FIG. 6 is a side view of the outside-skin part with respect to a longitudinal direction.

In the step of curing (heating and hardening) the prepreg, the stringers and the connecting members to form an outside-skin part of composite material in which the stringers, the connecting members and the outside skin are united (STEP7), as shown in FIG. 5, the prepreg outside skin 6, the plurality of semicured ladder-like reinforcing structures 5 and a mandrel 8 made of silicon are disposed at respective predetermined positions. The whole components are covered by a bagging film 9. Then, the whole components are pressed and heated, so that the plurality of semicured ladder-like reinforcing structures 5 and the pre-cured prepreg outside skin 6 are completely cured and united. Thus, as shown in FIG. 4, the outside-skin part 20, in which the stringers 1, the connecting members 4 and the prepreg outside skin 6 are united, is formed.

Figure 8:
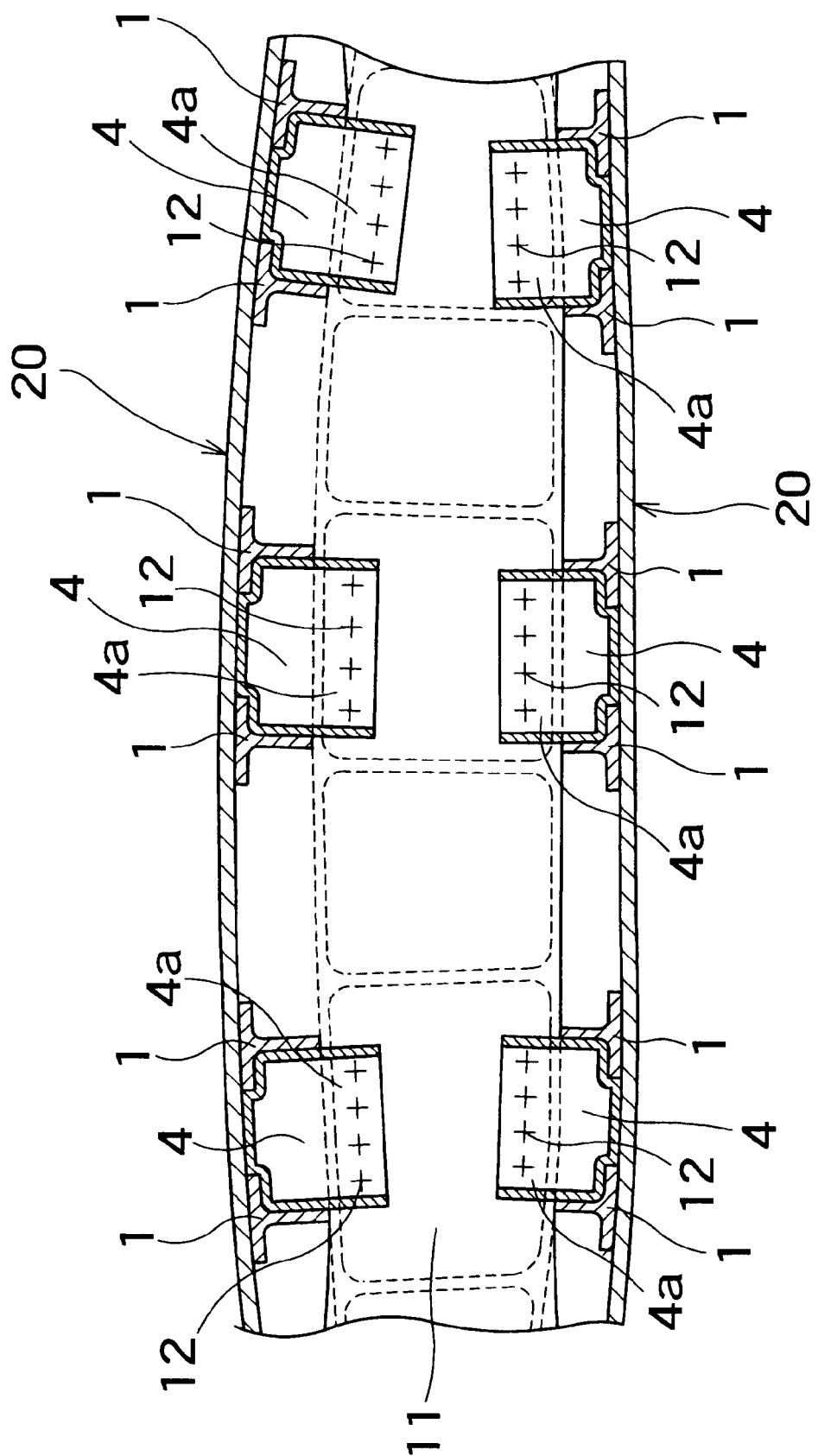
FIG. 8 is a sectional view of an embodiment of a panel of composite material according to the invention.

In the step of connecting two outside-skin parts with each other via a reinforcing member to form a box (panel) of composite material (STEP8), as shown in FIG. 8, extended portions 4a of the connecting members 4 of one of the outside-skin parts 20 and extended portions 4a of the connecting members 4 of the other of the outside-skin parts 20 are connected to a reinforcing member 11 via fasteners 12. Thus, a panel of composite material is formed.

The panel of composite material has the two prepreg outside skins 6, 6 and the united stringers 1 and connecting members 4. The united stringers 1 and connecting members 4 are integratedly joined to the respective prepreg outside skins 6. In the united stringers 1 and connecting members 4, the extended portions 4a of the connecting members 4 protrude upward with respect to the stringers 1. The extended portions 4a are joined to the reinforcing member 11 by means of fasteners 12. For the joining operation, the operational holes are used.

The panel of composite material may be used as an aircraft fuselage.

Then, a method of fabricating a wing of composite material according to the invention is explained.

The method of fabricating a wing of composite material is different from the above method of fabricating a panel of composite material in that components of the wing are different from components of the panel. In addition, the last steps of the former method are different from the last steps of the latter method. Other steps are substantially the same. Thus, only the different points are explained.

A lower wing-outside-skin 20 in the method of fabricating the wing of composite material in which the stringers 1, the connecting members 4 and the prepreg outside skin 6 are united corresponds to the panel-outside-skin part 20 in the method of fabricating the panel of composite material in which the stringers 1, the connecting members 4 and the prepreg outside skin 6 are united.

Figure 9:
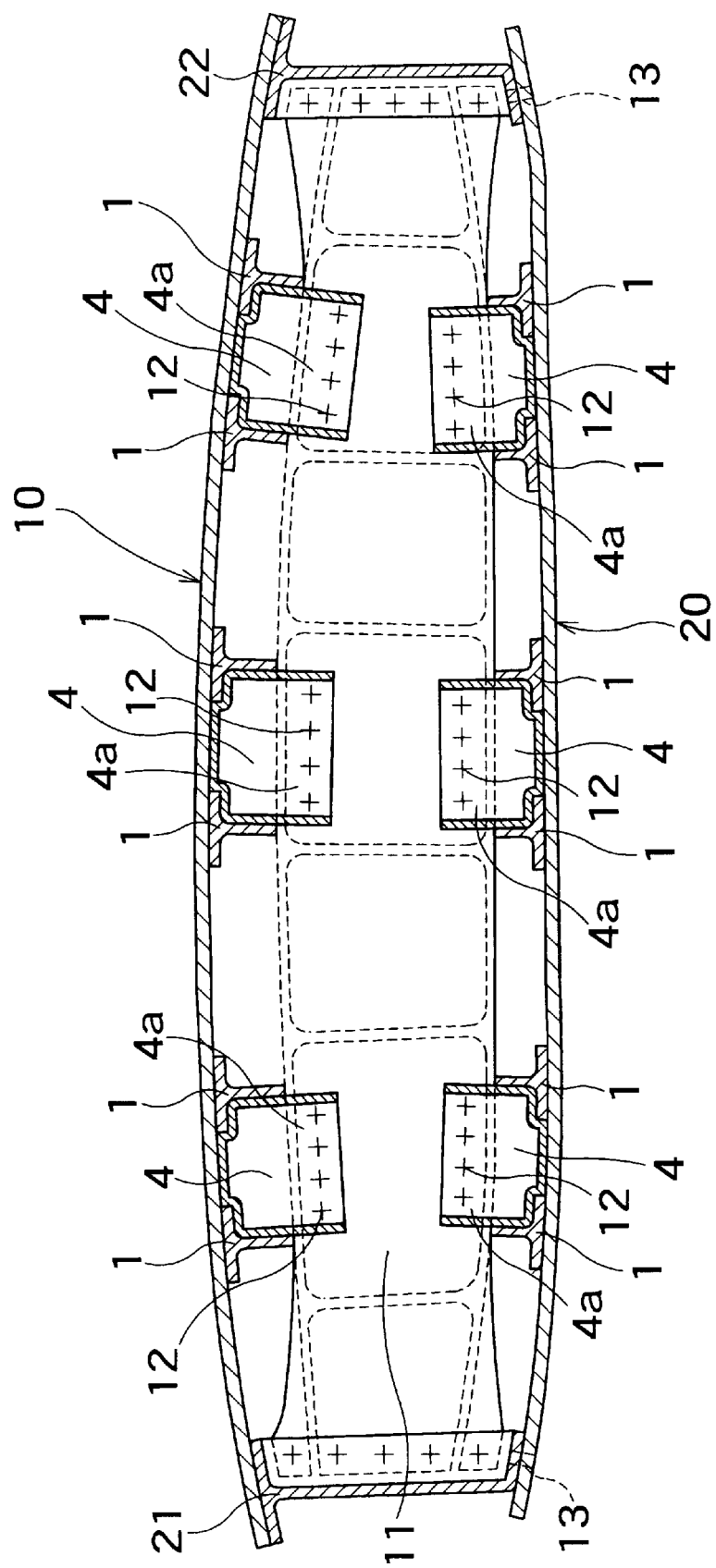
FIG. 9 is a sectional view of an embodiment of a wing of composite material according to the invention.

An upper wing-outside-skin 10 is formed substantially similarly to the lower wing-outside-skin 20. However, as shown in FIG. 9, a front spar 21 and a rear spar 22 are integratedly joined to the upper wing-outside-skin 10. The front spar 21 and the rear spar 22 are formed into a semicured state by another step. The upper wing-outside-skin 10 together with the front and rear spars is fixed to a mandrel made of silicon that has been put on a prepreg outside skin 6 via an adhesive film, similarly to the ladder-like reinforcing structures 5. Then, the upper wing-outside-skin 10 is covered by a bagging film, and pressed and heated to form an upper wing-outside-skin part 10 as one body.

The upper wing-outside-skin 10 and the lower wing-outside-skin 20 are connected to each other via a reinforcing member 11 to form a predetermined shape of the wing. In the case, the upper wing-outside-skin 10 is fixed in a jig, the reinforcing member 11 is connected (joined) to the extended portions 4a of the connecting members 4, the front spar 21 and the rear spar 22 by means of fasteners 12.

Then, the lower wing-outside-skin 20 is positioned relative to the front spar 21 and the rear spar 22 that has been set in the jig. The lower wing-outside-skin 20 is joined to the front spar 21 and the rear spar 22 by means of fasteners 13 such as rivets or bolts.

After the lower wing-outside-skin 20 is joined to the upper wing-outside-skin 10 via the front spar 21 and the rear spar 22, the extended portions 4a of the connecting members 4 of the lower wing-outside-skin 20 is joined to the reinforcing member 11 by means of fasteners 12. For the joining operation, the operational holes may be used.

According to the above method of fabricating a panel of composite material, since the stringers and the connecting member are integratedly made by a resin impregnation method, dimensional accuracy of the stringers and the connecting member may be improved. That is, the connecting member may be positioned more accurately. Thus, it is unnecessary to adjust a gap between the connecting member and the reinforcing member, so that assembling time may be reduced.

In addition, according to the above method of fabricating a panel of composite material, the stringers and the connecting member may be united in the semicured state. Thus, it is easy to cure and unite the united stringers and connecting member and the other components. In addition, a non-destructive test can be easily conducted to the united stringers and connecting member. Thus, assembling time may be more reduced, and accuracy may be more improved.

In addition, according to the above method of fabricating a panel of composite material, the forming mold for the resin impregnation method has to have only elongate grooves, that is, the forming mold may be very simple. In addition, some other jigs used in the curing step may be also simple. Thus, it is easy to correspond to variable sizes of the panel of composite material.

What is claimed is:

1. A panel of composite material comprising:

two outside-skin parts, each including an outside skin, a plurality of stringers, connecting members for connecting the plurality of stringers, and a reinforcing member connecting the two outside-skin parts with each other;

wherein each of the two outside-skin parts is formed into one body, at least one of the connecting members has a portion protruding upward from the plurality of stringers, the portion is connected to the reinforcing member via a fastener.

2. An aircraft containing the panel of claim 1.

3. A wing of composite material comprising:

two outside-skin parts, each including an outside skin, a plurality of stringers, connecting members for connecting the plurality of stringers, and a reinforcing member connecting the two outside-skin parts with each other;

wherein each of the two outside-skin parts is formed into the shape of a wing, at least one of the connecting members has a portion protruding upward from the plurality of stringers, and said portion is connected to the reinforcing member via a fastener.

* * * * *